(12) United States Patent
Zhou et al.

(10) Patent No.: US 10,354,158 B2
(45) Date of Patent: Jul. 16, 2019

(54) IRIS-BASED LIVING-BODY DETECTION METHOD, MOBILE TERMINAL AND STORAGE MEDIUM

(71) Applicant: GUANGDONG OPPO MOBILE TELECOMMUNICATIONS CORP., LTD., Dongguan, Guangdong (CN)

(72) Inventors: Haitao Zhou, Dongguan (CN); Yibao Zhou, Dongguan (CN); Cheng Tang, Dongguan (CN); Xueyong Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/027,550

(22) Filed: Jul. 5, 2018

(65) Prior Publication Data

US 2019/0019047 A1   Jan. 17, 2019

(30) Foreign Application Priority Data

Jul. 14, 2017   (CN) .......................... 2017 1 0577354

(51) Int. Cl.
   *H04M 1/66*   (2006.01)
   *G06K 9/00*   (2006.01)
   (Continued)

(52) U.S. Cl.
   CPC ......... *G06K 9/00906* (2013.01); *G06F 3/013* (2013.01); *G06F 21/32* (2013.01);
   (Continued)

(58) Field of Classification Search
   CPC ............. G06K 9/00906; G06K 9/0061; G06K 9/00617; G06K 9/00604; G06F 21/32;
   (Continued)

(56) References Cited

U.S. PATENT DOCUMENTS 9,767,358 B2    9/2017  Xue et al.
2016/0019421 A1  1/2016  Feng et al.
(Continued)

FOREIGN PATENT DOCUMENTS

CN    105139006 A    12/2015
CN    105320939 A    2/2016
(Continued)

OTHER PUBLICATIONS

International Search Report in international application No. PCT/CN2018/095152, dated Sep. 25, 2018.
(Continued)

*Primary Examiner* — Amancio Gonzalez
(74) *Attorney, Agent, or Firm* — Ladas & Parry, LLP

(57) ABSTRACT

Disclosed are an iris-based living-body detection method, a mobile terminal and a storage medium. According to the method, in response to detection of the mobile terminal being lifted, the touch display screen is lighted, and the touch display screen is controlled to display preset guide content, the preset guide content is used to guide eyes watching the touch display screen to move; the iris recognition apparatus is notified to perform iris acquisition for a target object associated with the eyes, to obtain a plurality of iris images; and it is determined whether the target object is a living body with the plurality of iris images.

17 Claims, 7 Drawing Sheets

(51) Int. Cl.
| | |
|---|---|
| *G06F 3/01* | (2006.01) |
| *G06F 21/32* | (2013.01) |
| *G06K 9/03* | (2006.01) |
| *G06K 9/22* | (2006.01) |
| *G06K 9/52* | (2006.01) |
| *H04L 29/06* | (2006.01) |
| *H04W 12/06* | (2009.01) |
| *H04M 1/725* | (2006.01) |
| *G06F 3/041* | (2006.01) |

(52) U.S. Cl.
CPC ....... *G06K 9/0061* (2013.01); *G06K 9/00604* (2013.01); *G06K 9/00617* (2013.01); *G06K 9/00899* (2013.01); *G06K 9/00912* (2013.01); *G06K 9/036* (2013.01); *G06K 9/22* (2013.01); *G06K 9/527* (2013.01); *H04L 63/0861* (2013.01); *H04M 1/72569* (2013.01); *H04W 12/06* (2013.01); *G06F 3/041* (2013.01); *H04M 2250/12* (2013.01); *H04M 2250/52* (2013.01)

(58) Field of Classification Search
CPC .............. G06F 3/041; H04M 1/72569; H04M 2250/52; H04M 2250/12
USPC ......................................................... 455/411
See application file for complete search history.

(56) References Cited

U.S. PATENT DOCUMENTS

| | | | |
|---|---|---|---|
| 2016/0117544 A1 | 4/2016 | Hoyos et al. | |
| 2016/0342836 A1* | 11/2016 | Hanna ................ | G06K 9/00604 |
| 2017/0124394 A1* | 5/2017 | Thavalengal ...... | G06K 9/00617 |
| 2017/0201684 A1* | 7/2017 | Kang ................. | H04N 5/23245 |
| 2017/0344793 A1 | 11/2017 | Xue et al. | |
| 2017/0351929 A1* | 12/2017 | Kim ........................ | G09G 5/10 |
| 2018/0012007 A1 | 1/2018 | Kim et al. | |

FOREIGN PATENT DOCUMENTS

| | | |
|---|---|---|
| CN | 105760739 A | 7/2016 |
| CN | 106326864 A | 1/2017 |
| CN | 107403147 A | 11/2017 |
| EP | 3249567 A1 | 11/2017 |
| WO | 2016010724 A1 | 1/2016 |
| WO | 2016117755 A1 | 7/2016 |

OTHER PUBLICATIONS

Written Opinion of the International Search Authority in international application No. PCT/CN2018/095152, dated Sep. 25, 2018.
Ahmad et al., "Integrate Liveness Detection with Iris Verification to Construct Support Biometric System", Journal of Computer Ano Communications, vol. 04, No. 01, Jan. 26, 2016 (Jan. 26, 2016), pp. 23-32, XP055525379, ISSN: 2327-5219, DOI: 10.4236/jcc.2016.41003 * section 3.1.2*.
Azizi et al., "A Novel Method Using Contourlet to Extract Features for Iris Recognition System", Sep. 16, 2009 (Sep. 16, 2009), Emerging Intelligent Computing Technology Ano Applications, Springer Berlin Heioelberg, Berlin, Heidelberg, pp. 544-554, XP019127811, ISBN: 978-3-642-04069-6 * abstract * * figure 2*.
Khalighi et al., "Iris Recognition using Robust Localization and Nonsubsampled Contourlet Based Features", Journal of Signal Processing Systems, Springer, US, vol. 81, No. 1, Jun. 24, 2014(Jun. 24, 2014),pp. 111-128, XP035509731, ISSN: 1939-8018, DOI: 10. 1007/S11265-014-0911-2 [retrieved on Jun. 24, 2014] * abstract *.
Park et al., : "A Study on Iris Localization and Recognition on Mobile Phones", EURASIP Journal on Aovances in Signal Processing, vol. 2008, No. 1, Oct. 16, 2007 (Oct. 16, 2007),pp. 1-12,XP055178969, DOI: 10.1155/2008/281943 * the whole document *.
Supplementary European Search Report in European application No. 18183328.6, dated Nov. 13, 2018.

* cited by examiner determine the area of the pupil for each of the multiple iris images successively in shooting time sequence, to obtain multiple area values — A1 determine change rates between successive area values in the multiple area values, and take an average value of all the change rates as the constriction change rate — A2

IRIS-BASED LIVING-BODY DETECTION METHOD, MOBILE TERMINAL AND STORAGE MEDIUM

TECHNICAL FIELD

The disclosure relates to the technical field of mobile terminals, and in particular to an iris-based living-body detection method, a mobile terminal and storage medium.

BACKGROUND

With increasing popularization and application of mobile terminals (mobile phones, tablet computers, etc.), mobile terminals can support more and more applications and become more powerful. The mobile terminals are being improved in terms of diversification and individuation and have become indispensable electronic products in lives of users.

Currently, iris recognition is increasingly favored by manufacturers of mobile terminals. The security of iris recognition is also one of the most important concerns. For security reasons, in general, it shall be ensured that a target object associated with the iris is a living body before the iris recognition. How to achieve iris-based living-body detection is to be solved urgently.

SUMMARY

The embodiments of the disclosure provide an iris-based living-body detection method, a mobile terminal and storage medium, intended to achieve iris-based living-body detection.

According to a first aspect, some embodiments of the disclosure provide an iris-based living-body detection method, executed by a mobile terminal comprising a touch display screen and an iris recognition apparatus. The method includes the following operations: in response to detection of the mobile terminal being lifted, lighting the touch display screen, and controlling the touch display screen to display preset guide content, wherein the preset guide content is used to guide eyes watching the touch display screen to move; notifying the iris recognition apparatus to perform iris acquisition for a target object associated with the eyes, to obtain a plurality of iris images; and determining whether the target object is a living body with the plurality of iris images.

According to a second aspect, some embodiments of the disclosure provide a mobile terminal, which includes an iris recognition apparatus, a touch display screen and a processor, wherein the processor is configured to, in response to detection of the mobile terminal being lifted: light the touch display screen and control the touch display screen to display preset guide content, wherein the preset guide content is used to guide eyes watching the touch display screen to move; notify the iris recognition apparatus to perform iris acquisition for a target object associated with the eyes, so as to obtain a plurality of iris images; and determine whether the target object associated with the eyes is a living body with the plurality of iris images; the touch display screen is configured to display the preset guide content after being lighted; and the iris recognition apparatus is configured to perform iris acquisition for the target object.

According to a third aspect, some embodiments of the disclosure provide a non-transitory computer-readable storage medium, wherein the computer-readable storage medium is configured to store a computer program, the computer program enabling a computer to execute some or all operations described in the first aspect of the embodiment of the disclosure.

BRIEF DESCRIPTION OF DRAWINGS

In order to more clearly illustrate the technical solutions in the embodiments of the disclosure or the conventional art, accompanying drawings needing to be used in the descriptions of the embodiments or the conventional art will be simply introduced hereinbelow. Obviously, the drawings described hereinbelow are merely some embodiments of the disclosure. Without making creative works, a person of ordinary skill in the art may also obtain other drawings according to these drawings.

DETAILED DESCRIPTION

Figure 1:
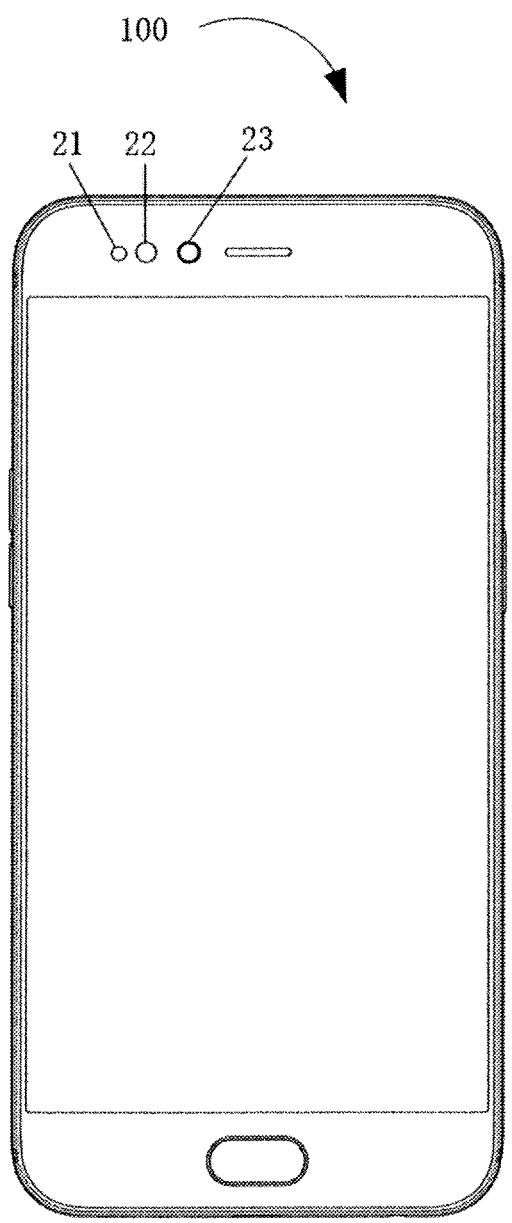
FIG. 1 illustrates a structure diagram of a smart phone according to some embodiments of the disclosure.

In order to make a person skilled in the art better understand the solutions of the disclosure, the technical solutions in the embodiments of the disclosure will be clearly and completely described hereinbelow with reference to the drawings in the embodiments of the disclosure. Obviously, the described embodiments are only a part of the embodiments of the disclosure, not all of the embodiments. On the basis of the embodiments of the disclosure, all other embodiments obtained on the premise of no creative work of a person skilled in the art should fall within the scope of protection of the disclosure.

The specification and claims of the disclosure and terms "first", "second" and the like in the drawings are used for distinguishing similar objects rather than describing a specific sequence. In addition, terms "include" and "have" and any inflexions thereof are intended to cover non-exclusive inclusions. For example, processes, methods, systems, products or devices containing a series of operations or units are not limited to operations or units which have been already listed, and other operations or units which are not listed or are inherent to these processes, methods, products or devices are alternatively included instead.

Mentioning of "embodiments" in the disclosure means that specific features, structures or characteristics described in the embodiments may be included in at least one embodiment of the disclosure. The phrase occurring at each position in the specification is not always the same embodiment, or not an independent or alternative embodiment mutually exclusive to other embodiments. A person skilled in the art explicitly and implicitly understands that the embodiments described in the disclosure may be combined with other embodiments.

The mobile terminal involved in the embodiments of the disclosure may include various handheld devices with a wireless communication function, on-board devices, wearable devices, computing devices or other processing devices connected to a wireless modem, and various forms of User Equipment (UE), Mobile Stations (MSs), terminal devices, etc. For convenience of description, the above-mentioned devices are collectively referred to as mobile terminals. The embodiments of the disclosure will be introduced in detail below. FIG. 1 illustrates an example of a smart phone 100. An iris recognition apparatus of the smart phone 100 may include a supplementary infrared light lamp 21 and an infrared camera 22. During operation of the iris recognition apparatus, the light of the supplementary infrared light lamp 21 is emitted toward an iris, then reflected by the iris and received by the infrared camera 22, the iris recognition apparatus acquires an iris image, a front camera 23 may be a visible light camera, and a touch display screen 24 may be used to light the screen.

Figure 2:
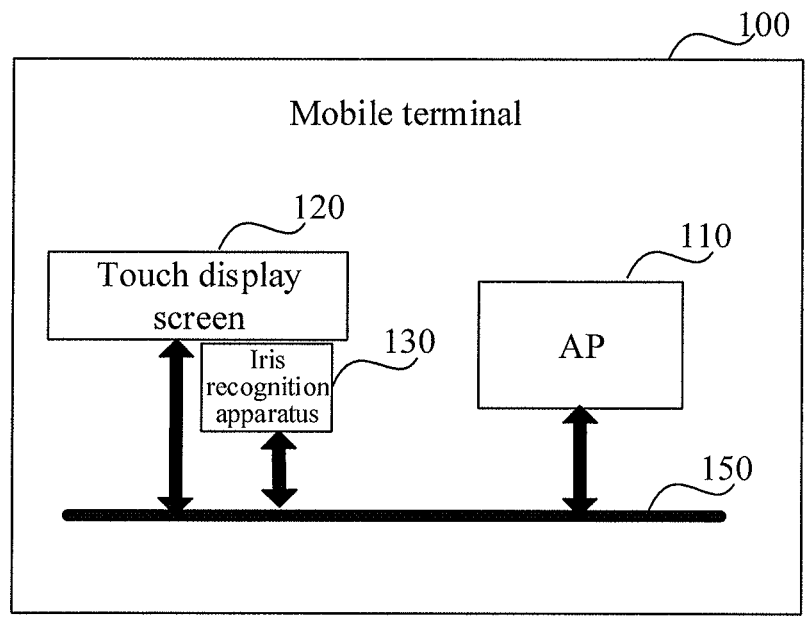
FIG. 2 illustrates a structure diagram of a mobile terminal according to some embodiments of the disclosure.
Figure 3:
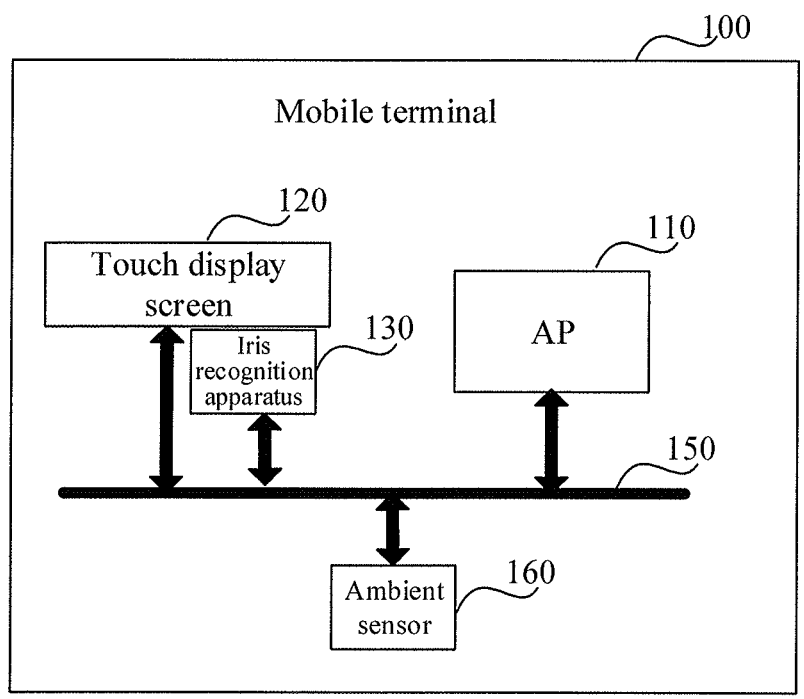
FIG. 3 illustrates another structure diagram of a mobile terminal according to some embodiments of the disclosure.
Figure 4:
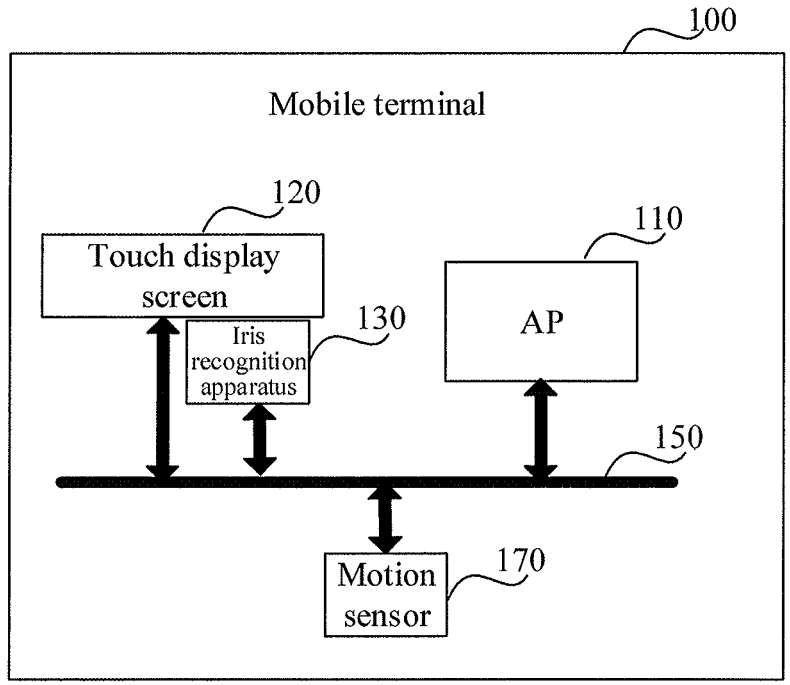
FIG. 4 illustrates yet another structure diagram of a mobile terminal according to some embodiments of the disclosure.

Turn to FIG. 2. FIG. 2 illustrates a structure diagram of a mobile terminal 100 according to some embodiments of the disclosure. The mobile terminal 100 includes a processor (e.g., an application processor (AP)) 110, a touch display screen 120, and an iris recognition apparatus 130. The iris recognition apparatus 130 may be integrated with the touch display screen 120, or, the iris recognition apparatus and the touch display screen 120 may be provided independently. The AP 110 is connected to the touch display screen 120 and the iris recognition apparatus 130 via a bus 150. Further, turn to FIG. 3. FIG. 3 is a modified structure of the mobile terminal 100 depicted in FIG. 2. Compared with FIG. 2, FIG. 3 further includes an ambient sensor 160. Further, turn to FIG. 4. FIG. 4 is a modified structure of the mobile terminal 100 depicted in FIG. 2. Compared with FIG. 2, FIG. 4 further includes a motion sensor 170.

In some possible embodiments, the processor 110 is configured to, in response to detection of the mobile terminal being lifted: light the touch display screen and control the touch display screen to display preset guide content, wherein the preset guide content is used to guide eyes watching the touch display screen to move; notify the iris recognition apparatus to perform iris acquisition for a target object associated with the eyes, so as to obtain a plurality of iris images; and determine whether the target object associated with the eyes is a living body with the plurality of iris images. The touch display screen 120 is configured to display the preset guide content after being lighted. The iris recognition apparatus 130 is configured to perform iris acquisition for the target object.

In some possible embodiments, when the mobile terminal is being lifted, the touch display screen 120 is lighted and is configured to display preset guide content and notify the iris recognition apparatus 130 to perform iris acquisition. The preset guide content is used to guide the user's eyes to move. The iris recognition apparatus 130 is configured to perform iris acquisition for a target object to obtain multiple iris images, and send the multiple iris images to the AP 110. The AP 110 is configured to determine whether the target object is a living body with the multiple iris images.

In some possible embodiments, in terms of determining whether the target object is a living body with the multiple iris images, the AP 110 is specifically configured to determine a constriction change rate of a pupil with the multiple iris images, and confirm that the target object is a living body when the constriction change rate is within a preset range.

In some possible embodiments, in terms of determining a constriction change rate of a pupil with the multiple iris images, the AP 110 is specifically configured to determine an area of the pupil for each of the multiple iris images successively in shooting time sequence to obtain multiple area values, and determine change rates between successive area values in the multiple area values, and take an average value of all the change rates as the constriction change rate.

In some possible embodiments, the mobile terminal further includes a motion sensor 170.

The motion sensor 170 is specifically configured to: obtain a value of a motion parameter and send the value of the motion parameter to the AP 110, which determines an anti-shake coefficient corresponding to the value of the motion parameter and sends the anti-shake coefficient to the iris recognition apparatus 130. In some possible embodiments, the mobile terminal further includes an ambient sensor 160.

The ambient sensor 160 is specifically configured to acquire a value of an ambient parameter and send the value of the ambient parameter to the AP 110, which determines a value of an iris acquisition parameter corresponding to the value of the ambient parameter and sends the value of the iris acquisition parameter to the iris recognition apparatus 130.

Figure 5:
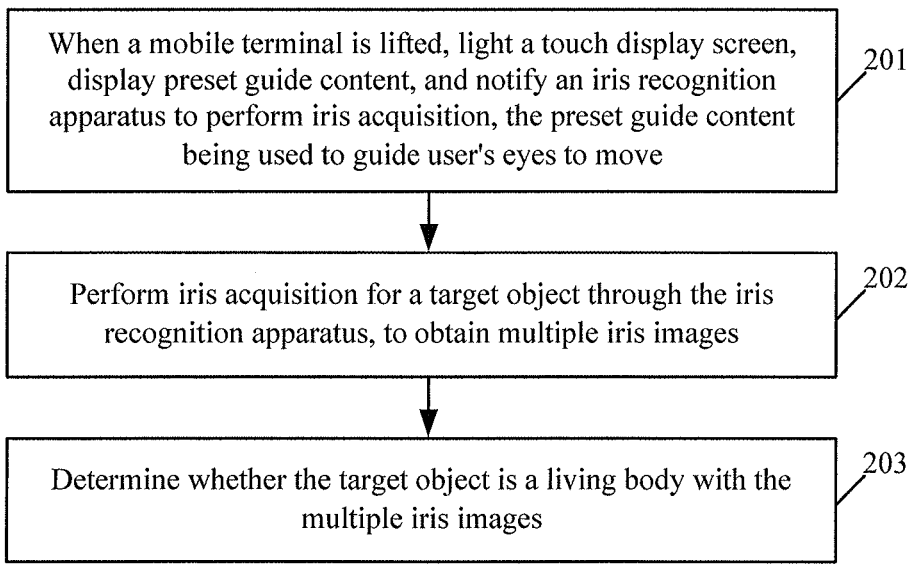
FIG. 5 illustrates a flowchart of an iris-based living-body detection method according to some embodiments of the disclosure.

Now, turn to FIG. 5. FIG. 5 illustrates a flowchart of an iris-based living-body detection method according to some embodiments of the disclosure. The method may be applied to a mobile terminal including an iris recognition apparatus, a touch display screen and an AP. A physical diagram and a structure diagram of the mobile terminal may be seen from FIG. 1 to FIG. 4. The present iris-based living-body detection method includes the following operations illustrated in blocks. The operations may begin from block 201.

At block 201, when a mobile terminal is being lifted, a touch display screen is lighted, preset guide content is displayed, and an iris recognition apparatus is notified to perform iris acquisition. The preset guide content is used to guide a user's eyes to move.

Herein, a motion sensor of the mobile terminal may be employed to detect whether the mobile terminal is being lifted. The motion sensor may be at least one of the following: a gyroscope, an acceleration sensor, a gravity sensor, or etc. The preset guide content may be a pre-stored dynamic picture and dynamic video, or a cursor direction, etc. When the mobile terminal is being lifted, the touch display screen is lighted, preset guide content is displayed to guide user's eyes to follow a guide direction implied by the preset guide content, and the iris recognition apparatus is notified to perform iris acquisition. Of course, after the touch display screen is lighted, the display screen will become bright, the user's eyes will be affected by light from the screen, and pupil constriction will also be obvious. In addition, the mobile terminal is in a moving state during the lifting process, and user's pupil changes or iris changes may be acquired from different angles.

At block 202, iris acquisition is performed for a target object through the iris recognition apparatus, to obtain multiple iris images.

Herein, the iris recognition apparatus in block 202 is in a moving state, and therefore the acquired multiple iris images are iris images acquired from different view angles.

Alternatively, the mobile terminal is further provided with a motion sensor, and between block 201 and block 202, or before block 201, the method may further include the operations as follows.

A value of a motion parameter is acquired by means of the motion sensor and sent to the AP, and the AP determines an anti-shake coefficient corresponding to the value of the motion parameter and sends the anti-shake coefficient to the iris recognition apparatus.

Herein, the above-mentioned motion parameter may include: acceleration and angle change rate, etc. Specifically, the value of the motion parameter may be detected by the motion sensor. A mapping relationship between the motion parameter and the anti-shake coefficient may be pre-stored in the mobile terminal, and further, the anti-shake coefficient corresponding to the value of motion parameter may be determined according to the mapping relationship, and the iris recognition apparatus is notified to perform iris acquisition according to the anti-shake coefficient. It can be seen that an image blurring phenomenon occurs for the iris recognition apparatus under motion. Therefore, the image blurring phenomenon may be suppressed to a certain extent by using an anti-shake coefficient, which can improve the quality of iris images and facilitate the subsequent matching operation of the iris images.

At block 203, it is determined whether the target object is a living body with the multiple iris images.

Herein, whether the target object is a living body is determined by analyzing the multiple iris images. For example, the pupil change rate of a user may be determined with the multiple iris images, or the eye area change of the user may be determined (usually, in particular, in a dark environment, the user's eyes may be greatly constricted due to strong light). Thus, it may be determined whether the target object is a living body according to these features.

From the perspective of the mobile terminal, particularly, a processor of the mobile terminal, the iris-based living-body detection method includes the following operations: in response to detection of the mobile terminal being lifted, lighting the touch display screen, and controlling the touch display screen to display preset guide content, wherein the preset guide content is used to guide eyes watching the touch display screen to move; notifying the iris recognition apparatus to perform iris acquisition for a target object associated with the eyes, to obtain a plurality of iris images; and determining whether the target object is a living body with the plurality of iris images.

Alternatively, in block 203, a specific manner of determining whether the target object is a living body with the multiple iris images is as follows.

A constriction change rate of a pupil is determined with the multiple iris images, and it is confirmed that the target object is a living body when the constriction change rate is within a preset range.

Herein, the above-mentioned preset range may be user-defined or system default. The multiple iris images are arranged in shooting time sequence. An absolute value of the pupil area difference between two adjacent iris images may be calculated in sequence to obtain multiple absolute values, and an average value of the multiple absolute values is taken as the constriction change rate of the pupil for the multiple iris images. If the constriction change rate is within a preset range, it is confirmed that the target object is a living body, otherwise, the target object is a non-living body.

Figures 11, 12:
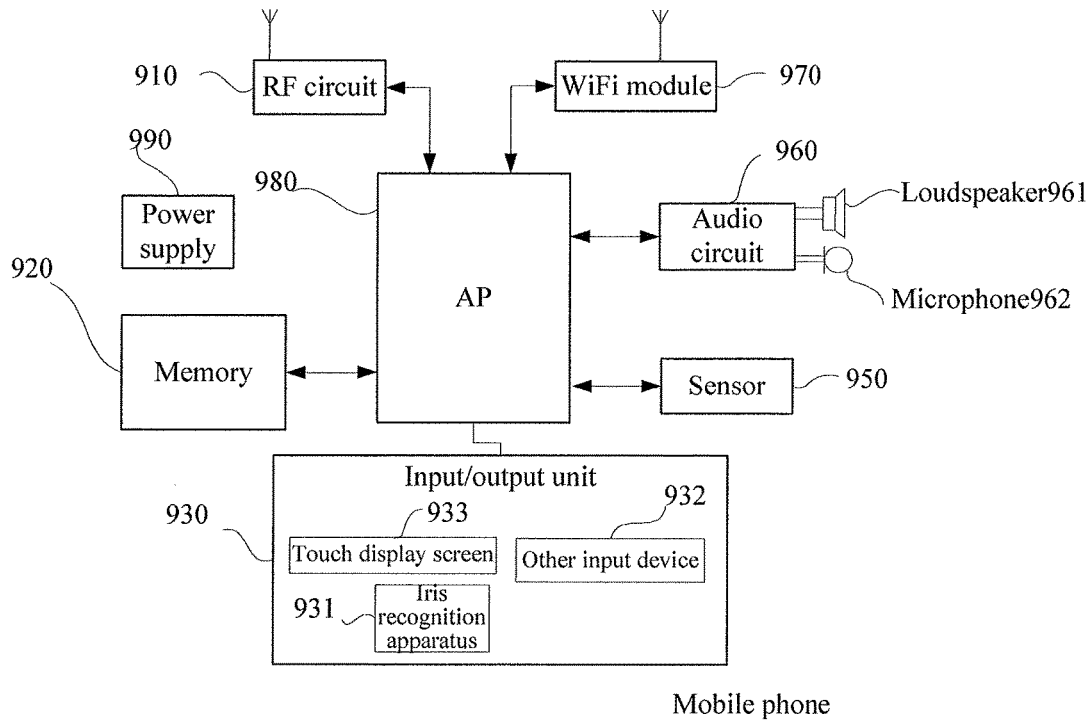
FIG. 11 illustrates a structure diagram of another mobile terminal according to some embodiments of the disclosure.
FIG. 12 illustrates a flowchart of a process of determining the constriction change rate of a pupil according to some embodiments of the disclosure.
Figure 13:
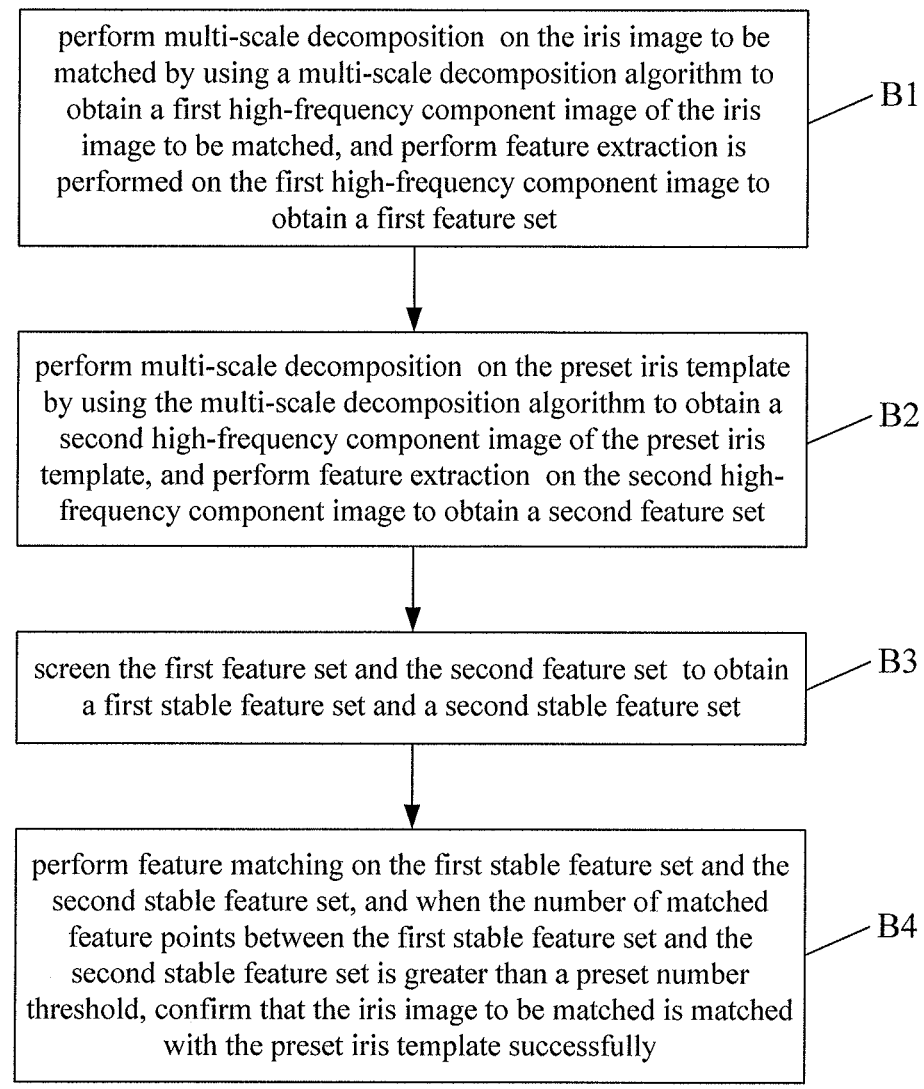
FIG. 13 illustrates a flowchart of a process of matching the iris image to be matched with a preset iris template according to some embodiments of the disclosure.

Alternatively, as shown in FIG. 12, the operation of determining the constriction change rate of a pupil with the multiple iris images may include the operations as follows.

At A1, the area of the pupil is determined for each of the multiple iris images successively in shooting time sequence, to obtain multiple area values.

At A2, change rates between successive area values in the multiple area values are determined, and an average value of all the change rates is taken as the constriction change rate.

Herein, the multiple iris images are arranged in shooting time sequence. The area of the pupil for each of the multiple iris images may be determined successively, so as to obtain multiple area values. Further, change rates between successive area values are calculated, and an average value of the change rates is taken as the constriction change rate.

Alternatively, after block 203, the method may further include the operation as follows.

An iris image with the best image quality is selected as an iris image to be matched from the multiple iris images, and the iris image to be matched is matched with a preset iris template. If the matching is successful, an unlocking operation is executed.

Herein, the mobile terminal may perform image quality evaluation on each of the multiple iris images, to obtain image quality evaluation values, and select an iris image corresponding to the maximum image quality evaluation value as an iris image to be matched. At least one image quality evaluation index may be used to evaluate the image quality of the iris images, so as to obtain the image quality evaluation values. Specifically, when evaluating the quality of an iris image, multiple image quality evaluation indexes may be used, each image quality evaluation index corresponding to a weight. Thus, when performing image quality evaluation on an image with each image quality evaluation index, a respective evaluation result may be obtained, and finally, a weighting operation is performed to obtain a final image quality evaluation value. The image quality evaluation index may include, but is not limited to, an average value, a standard deviation, an entropy, sharpness, a signal to noise ratio, etc.

It is to be noted that since using a single evaluation index to evaluate image quality has certain limitations, multiple image quality evaluation indexes may be used to evaluate image quality. Of course, when evaluating image quality, more image quality evaluation indexes do not always result a better evaluation, because more image quality evaluation indexes cause higher calculation complexity of an image quality evaluation process and not necessarily better image quality evaluation effects. Therefore, in the case of higher requirements for image quality evaluation, two to ten image quality evaluation indexes may be used to evaluate the image quality. Specifically, the number of image quality evaluation indexes and a specific index may be selected depending on specific implementation conditions. Of course, the image quality evaluation index is selected in consideration of a specific scenario, for example, image quality indexes selected for the image quality evaluations in the dark environment may be different from those in the bright environment.

Alternatively, in the case of a low requirement on the image quality evaluation accuracy, a single image quality evaluation index may be used for evaluation. For example, image quality evaluation is performed on an image to be processed with entropy. It may be considered that the larger the entropy is, the higher the image quality is. Conversely, the smaller the entropy is, the worse the image quality is.

Alternatively, in the case of a high requirement on the image quality evaluation accuracy, multiple image quality evaluation indexes may be used to evaluate an image, when performing image quality evaluation on the image with multiple image quality evaluation indexes, the weight of each of the multiple image quality evaluation indexes may be set, multiple image quality evaluation values may be obtained, and a final image quality evaluation value may be obtained according to the multiple image quality evaluation values and their corresponding weights. For example, three image quality evaluation indexes are used, i.e., an index A, an index B, and an index C, the weight of A is a1, the weight of B is a2, and the weight of C is a3. When A, B, and C are used to evaluate the image quality of a certain image, an image quality evaluation value corresponding to A is b1, an image quality evaluation value corresponding to B is b2, and an image quality evaluation value corresponding to C is b3. Then, a final image quality evaluation value is equal to a1*b1+a2*b2+a3*b3. In general, the larger the image quality evaluation value is, the better the image quality is.

Figure 8:
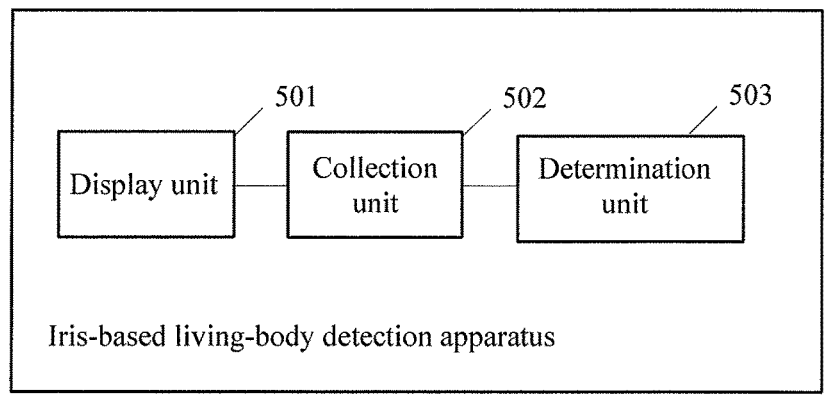
FIG. 8 illustrates a structure diagram of an iris-based living-body detection apparatus according to some embodiments of the disclosure.

Further, alternatively, as shown in FIG. 8, the operation of matching the iris image to be matched with a preset iris template may include the following operations as illustrated in blocks. The operations may begin from block B1.

At block B1, multi-scale decomposition is performed on the iris image to be matched by using a multi-scale decomposition algorithm to obtain a first high-frequency component image of the iris image to be matched, and feature extraction is performed on the first high-frequency component image to obtain a first feature set.

At block B2, multi-scale decomposition is performed on the preset iris template by using the multi-scale decomposition algorithm to obtain a second high-frequency component image of the preset iris template, and feature extraction is performed on the second high-frequency component image to obtain a second feature set.

At block B3, the first feature set and the second feature set are screened to obtain a first stable feature set and a second stable feature set.

At block B4, feature matching is performed on the first stable feature set and the second stable feature set, and when the number of matched feature points between the first stable feature set and the second stable feature set is greater than a preset number threshold, it is confirmed that the iris image to be matched is matched with the preset iris template successfully.

Herein, the multi-scale decomposition algorithm may be used to perform multi-scale decomposition on an iris image to be matched to obtain a low-frequency component image and multiple high-frequency component images. The first high-frequency component image may be one of the multiple high-frequency component images. The multi-scale decomposition algorithm may include, but is not limited to, wavelet transform, Laplace transform, Contourlet Transform (CT), Non-subsampled Contourlet Transform (NSCT), shear wave transform, etc. Taking CT as an example, multi-scale decomposition is performed on an iris image to be matched by using CT to obtain a low-frequency component image and multiple high-frequency component images, and each of the multiple high-frequency component images is of a different size. Taking NSCT as an example, multi-scale decomposition is performed on an iris image by using NSCT to obtain a low-frequency component image and multiple high-frequency component images, and each of the multiple high-frequency component images is of the same size. High-frequency component images contain more details about an original image. Similarly, a multi-scale decomposition algorithm may be used to perform multi-scale decomposition on a preset iris template to obtain a low-frequency component image and multiple high-frequency component images. The second high-frequency component image may be one of the multiple high-frequency component images. The position of the first high-frequency component image corresponds to the position of the second high-frequency component image, i.e., they are at a same layer and a same scale. For example, if the first high-frequency component image is at a second layer and a third scale, the second high-frequency component image is also at the second layer and the third scale. In block B3, the first feature set and the second feature set are screened to obtain the first stable feature set and the second stable feature set. The screening process may adopt the following manners. The first feature set may include multiple feature points. The second feature set also includes multiple feature points. Each feature point is a vector, which includes a size and a direction. Therefore, the modulus of each feature point may be calculated. If the modulus is larger than a certain threshold, the feature point is retained. In this way, the feature points can be screened, and the above-mentioned preset number threshold may be user-defined or system default, and the number of matched feature points between the first stable feature set and the second stable feature set can be understood as a match value therebetween. In block B1 to block B4, the main consideration is to achieve matching of fine features between the iris image to be matched and the preset iris image, so that the accuracy of iris recognition can be improved. Under normal circumstances, more detailed features are more difficult to forge, and therefore the iris recognition security can be improved.

It can be seen that in the embodiments of the disclosure, the method is applied to a mobile terminal including an iris recognition apparatus, a touch display screen and an AP. When the mobile terminal is being lifted, the touch display screen is lighted, preset guide content is displayed, and the iris recognition apparatus is notified to perform iris acquisition, the preset guide content being used to guide user's eyes to move; the iris recognition apparatus performs iris acquisition for a target object, so as to obtain multiple iris images; and it is determined whether the target object is a living body with the multiple iris images. As can be seen, in the lifting process of the mobile terminal, the touch display screen may be lighted, and then the preset guide content is displayed, so as to guide user's eyes to move, thereby acquiring multiple iris images from different view angles; and it is determined whether the target object is a living body with the multiple iris images. Thus, in the process of picking up a mobile terminal by a user, it can be determined whether an iris is related to a living body, thereby improving the iris-based living-body recognition efficiency.

Figure 6:
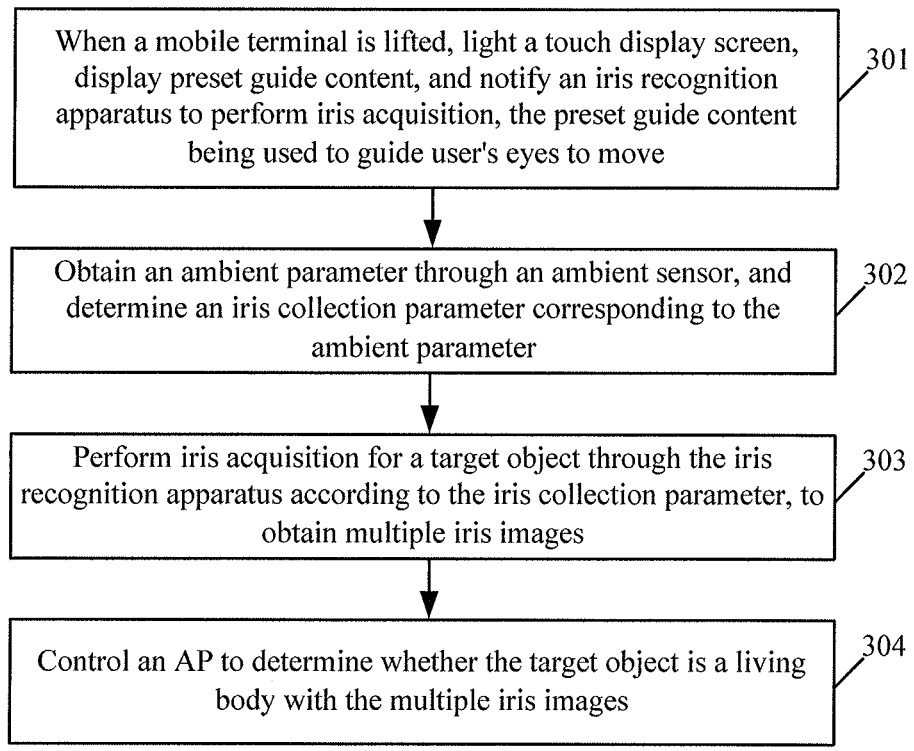
FIG. 6 illustrates a flowchart of another iris-based living-body detection method according to some embodiments of the disclosure.

Please turn to FIG. 6. FIG. 6 illustrates a flowchart of another iris-based living-body detection method according to some embodiments of the disclosure. The method is applied to a mobile terminal including an iris recognition apparatus, a touch display screen and an AP. A physical diagram and a structure diagram of the mobile terminal may be seen from FIG. 1 to FIG. 4. The present iris-based living-body detection method includes the following operations illustrated in blocks. The operations may begin from block 301.

At block 301, when a mobile terminal is being lifted, a touch display screen is lighted, preset guide content is displayed, and an iris recognition apparatus is notified to perform iris acquisition, the preset guide content being used to guide user's eyes to move.

At block 302, an ambient parameter is acquired by means of an ambient sensor, and an iris acquisition parameter corresponding to the ambient parameter is determined.

Herein, block 301 and block 302 may be executed in parallel, or block 301 is performed first, and then block 302 is performed, or block 302 is performed first, and then block 301 is performed.

Alternatively, the above-mentioned ambient sensor may be an ambient light sensor for detecting ambient brightness, or the ambient sensor may be a magnetic field sensor for detecting magnetic field intensity; the ambient sensor may be a humidity sensor for detecting ambient humidity, or the ambient sensor may be a temperature sensor for detecting ambient temperature. A mapping relationship between an ambient parameter and an iris acquisition parameter may be preset. After a value of a current ambient parameter is determined, a value of an iris acquisition parameter corresponding to the value of the current ambient parameter may be determined according to the mapping relationship. The above-mentioned iris acquisition parameter may include, but is not limited to, acquisition current, acquisition voltage, etc.

At block 303, iris acquisition is performed for a target object by means of the iris recognition apparatus according to the value of the iris acquisition parameter, so as to obtain multiple iris images.

At block 304, it is determined whether the target object is a living body with the multiple iris images.

It can be seen that in the embodiments of the disclosure, when a mobile terminal is being lifted, a touch display screen is lighted, preset guide content is displayed, and an iris recognition apparatus is notified to perform iris acquisition, the preset guide content being used to guide user's eyes to move; the iris recognition apparatus is controlled to perform iris acquisition for a target object, so as to obtain multiple iris images; and it is determined whether the target object is a living body with the multiple iris images. As can be seen, in the lifting process of the mobile terminal, the touch display screen may be lighted, and then the preset guide content is displayed, so as to guide user's eyes to move, thereby acquiring multiple iris images from different view angles; and it is determined whether the target object is a living body with the multiple iris images. Thus, in the process of picking up a mobile terminal by a user, it can be determined whether an iris is related to a living body, thereby improving the iris-based living-body recognition efficiency.

Figure 7:
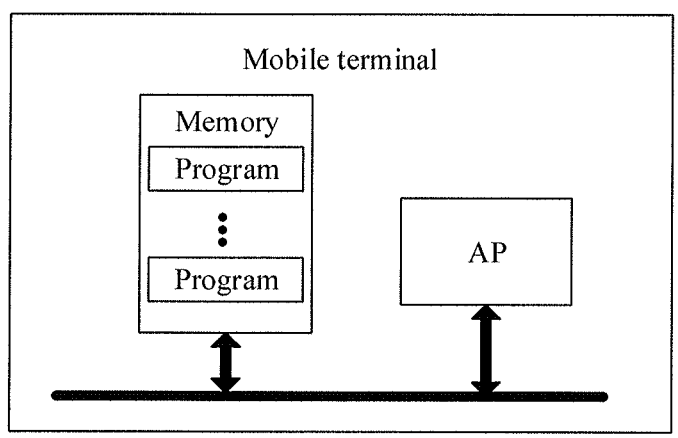
FIG. 7 illustrates another structure diagram of a mobile terminal according to some embodiments of the disclosure.

Please turn to FIG. 7. FIG. 7 is a mobile terminal according to some embodiments of the disclosure. The mobile terminal includes: an iris recognition apparatus, a touch display screen, an AP, and a memory, as well as one or more programs stored in the memory and configured to be executed by the AP, the program including instructions for executing the operations as follows.

In response to detection of the mobile terminal being lifted, the touch display screen is lighted, the touch display screen is controlled to display preset guide content, the preset guide content being used to guide eyes watching the touch display screen to move; the iris recognition apparatus is notified to perform iris acquisition for a target object associated with the eyes by means of the iris recognition apparatus, so as to obtain multiple iris images; and it is determined whether the target object is a living body with the multiple iris images.

In a possible example, in terms of determining whether the target object is a living body with the multiple iris images, the program further includes instructions for executing the operation as follows.

A constriction change rate of a pupil is determined with the multiple iris images, and it is confirmed that the target object is a living body when the constriction change rate is within a preset range.

In a possible example, in terms of determining a constriction change rate of a pupil with the multiple iris images, the program further includes instructions for executing the operations as follows.

The area of the pupil is determined for each of the multiple iris images successively in shooting time sequence, so as to obtain multiple area values.

Change rates between successive area values in the multiple area values is determined, and an average value of all the change rates is taken as the constriction change rate.

In a possible example, the mobile terminal is further provided with a motion sensor, and the program further includes instructions for executing the operation as follows.

A value of a motion parameter is acquired by means of the motion sensor, and an anti-shake coefficient corresponding to the value of the motion parameter is determined.

In terms of performing iris acquisition for a target object by means of the iris recognition apparatus so as to obtain multiple iris images, the program further includes instructions for executing the operation as follows.

Iris acquisition is performed for a target object by means of the iris recognition apparatus according to the anti-shake coefficient, so as to obtain multiple iris images.

In a possible example, the mobile terminal is further provided with an ambient sensor, and the program further includes instructions for executing the operation as follows.

A value of an ambient parameter is acquired by means of the ambient sensor, and a value of an iris acquisition parameter corresponding to the value of the ambient parameter is determined.

In terms of performing iris acquisition on a target object by means of the iris recognition apparatus so as to obtain multiple iris images, the program further includes instructions for executing the operation as follows.

Iris acquisition is performed for a target object by means of the iris recognition apparatus according to the value of the iris acquisition parameter, so as to obtain multiple iris images.

Please turn to FIG. 8. FIG. 8 illustrates a structure diagram of an iris-based living-body detection apparatus according to some embodiments of the disclosure. The iris-based living-body detection apparatus is applied to a mobile terminal including an iris recognition apparatus, a touch display screen and an AP. The iris-based living-body detection apparatus includes a display unit 501, an acquisition unit 502 and a determination unit 503.

The display unit 501 is configured to, in response to detection of a mobile terminal being lifted, light a touch display screen, display preset guide content, and notify an iris recognition apparatus to perform iris acquisition. The preset guide content is used to guide a user's eyes to move.

The acquisition unit 502 is configured to perform iris acquisition for a target object by means of the iris recognition apparatus, so as to obtain multiple iris images.

The determination unit 503 is configured to determine whether the target object is a living body with the multiple iris images.

Alternatively, the determination unit 503 is specifically configured to determine a constriction change rate of a pupil with the multiple iris images, and confirm that the target object is a living body when the constriction change rate is within a preset range.

Alternatively, the determination unit 503 determines a constriction change rate of a pupil with the multiple iris images in the following specific implementation manner: determining the area of the pupil for each of the multiple iris images successively in shooting time sequence, so as to obtain multiple area values; and determining change rates between successive area values in the multiple area values, and take an average value of all the change rates as the constriction change rate.

Figure 9:
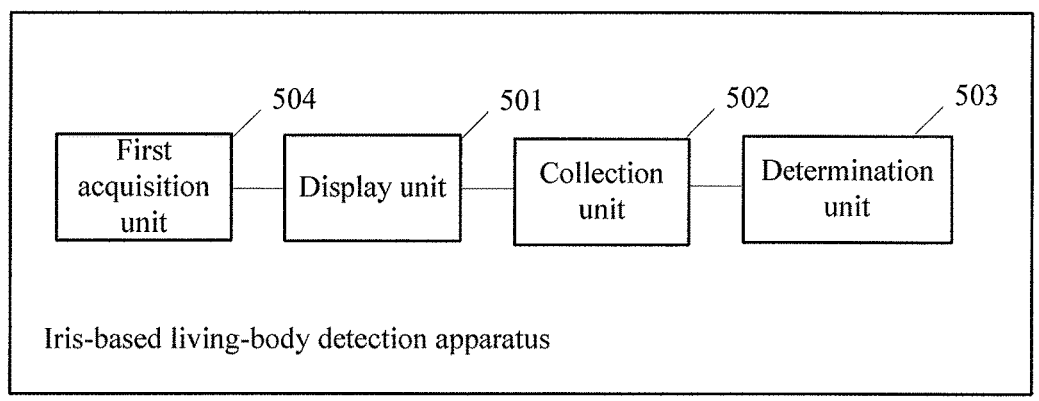
FIG. 9 illustrates another structure diagram of the iris-based living-body detection apparatus described in FIG. 8 according to some embodiments of the disclosure.

Alternatively, as illustrated in FIG. 9, FIG. 9 is another modified structure of the iris-based living-body detection apparatus depicted in FIG. 8. The mobile terminal is further provided with a motion sensor, and the iris-based living-body detection apparatus further includes a first acquisition unit 504, specifically as follows.

The first acquisition unit 504 is specifically configured to acquire a motion parameter by means of the motion sensor, and determine an anti-shake coefficient corresponding to the motion parameter, and the acquisition unit 502 performs iris acquisition on a target object by means of the iris recognition apparatus according to the anti-shake coefficient, so as to obtain multiple iris images.

Figure 10:
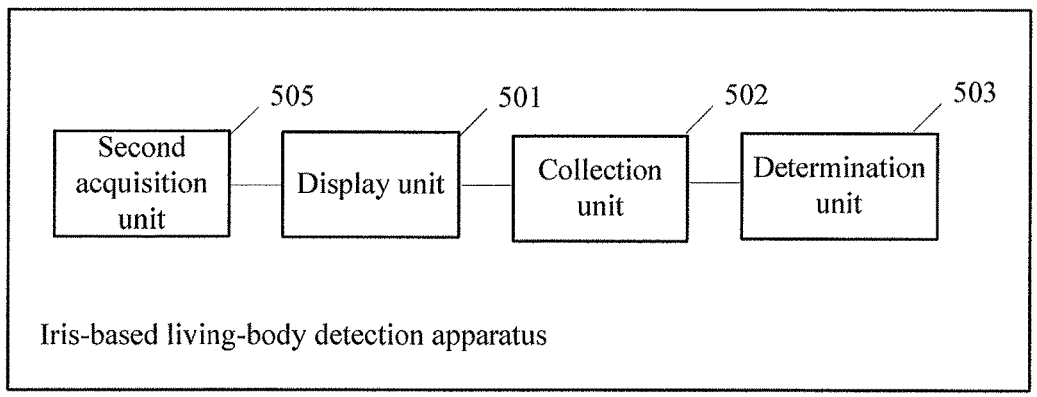
FIG. 10 illustrates yet another structure diagram of the iris-based living-body detection apparatus described in FIG. 8 according to some embodiments of the disclosure.

Alternatively, as illustrated in FIG. 10, FIG. 10 is yet another modified structure of the iris-based living-body detection apparatus described in FIG. 8. The mobile terminal is further provided with an ambient sensor, and the iris-based living-body detection apparatus further includes a second acquisition unit 505, specifically as follows.

The second acquisition unit 505 is specifically configured to acquire a value of an ambient parameter by means of the ambient sensor, and determine a value of an iris acquisition parameter corresponding to the value of the ambient parameter, and the acquisition unit 502 performs iris acquisition for a target object by means of the iris recognition apparatus according to the iris acquisition parameter, so as to obtain multiple iris images.

It can be seen that in the embodiments of the disclosure, the iris-based living-body detection apparatus is applied to a mobile terminal including an iris recognition apparatus, a touch display screen, and an AP. When the mobile terminal is being lifted, the touch display screen is lighted, preset guide content is displayed, and the iris recognition apparatus is notified to perform iris acquisition, the preset guide content being used to guide a user's eyes to move; the iris recognition apparatus performs iris acquisition for a target object, so as to obtain multiple iris images; and it is determined whether the target object is a living body with the multiple iris images. Obviously, in the lifting process of the mobile terminal, the touch display screen may be lighted, and then the preset guide content is displayed, so as to guide user's eyes to move, thereby acquiring multiple iris images from different angles; and it is determined whether the target object is a living body with the multiple iris images. Thus, in the process of picking up a mobile terminal by a user, it can be determined whether the iris is related to a living body, thereby improving the iris-based living-body recognition efficiency.

It can be understood that the functions of all program modules of the iris-based living-body detection apparatus in the present embodiment may be specifically implemented according to the method in the above-mentioned method embodiments. For a specific implementation process thereof, reference may be made to the related description of the above-mentioned method embodiments, and details are not described herein again.

The embodiments of the disclosure also provide another mobile terminal, as illustrated in FIG. 11. For convenience of description, only parts associated with the embodiments of the disclosure are illustrated. Specific technical details that are not disclosed refer to parts of the method in the embodiments of the disclosure. The mobile terminal may be any terminal device including a mobile phone, a tablet computer, a Personal Digital Assistant (PDA), a Point of Sales (POS) and an on-board computer. A mobile phone is taken as the mobile terminal.

FIG. 11 illustrates a partial structure diagram illustrating a mobile phone associated with a mobile terminal according to some embodiments of the disclosure. Referring to FIG. 11, the mobile phone includes an RF circuit 910, a memory 920, an input unit 930, a display unit 940, a sensor 950, an audio circuit 960, a Wireless Fidelity (WiFi) module 970, an AP 980, a power supply 990, and other parts. A person skilled in the art may understand that a mobile phone structure illustrated in FIG. 11 is not limitative to the mobile phone, and the mobile phone may include parts more or fewer than those illustrated in the figure, or combine some parts, or have different part arrangements.

Each component of the mobile phone will be specifically introduced below in conjunction with FIG. 11.

The input unit 930 may be configured to receive input digital or character information and generate key signal input associated with user setting and functional control of the mobile phone. Specifically, the input unit 930 may include a touch display screen 933, an iris recognition apparatus 931 and other input devices 932. Specifically, the other input devices 932 may include, but are not limited to, one or more of a physical keyboard, a functional key (such as a volume control key and a switch key), a track ball, a mouse and an operating rod.

Herein, the AP 980 is specifically configured to execute the following operations: when a mobile terminal is being lifted, lighting a touch display screen, displaying preset guide content, and notifying an iris recognition apparatus to perform iris acquisition, the preset guide content being used to guide user's eyes to move; performing iris acquisition on a target object by means of the iris recognition apparatus, so as to obtain multiple iris images; and determining whether the target object is a living body with the multiple iris images.

The AP 980 is a control center of the mobile phone, and is configured to connect all parts of the whole mobile phone by utilizing various interfaces and lines, to run or execute the software program and/or the module stored in the memory 920, and to call data stored in the memory 920 to execute various functions and processing data of the mobile phone, so as to wholly monitor the mobile phone. Alternatively, the AP 980 may include one or more processing units. Alternatively, the AP 980 may be integrated with an application processor and a modulation-demodulation processor, and the application processor mainly processes an operation system, a user interface, an application program and the like, and the modulation-demodulation processor mainly processes wireless communication. It may be understood that the modulation-demodulation processor may not be integrated into the AP 980.

In addition, the memory 920 may include a high-speed random access memory, and may further include a non-volatile memory such as a disk storage device, a flash device, or other non-volatile solid storage devices.

The RF circuit 910 may be configured to receive and transmit information. Usually, the RF circuit 910 includes, but not limited to, an antenna, at least one amplifier, a transceiver, a coupler, a Low Noise Amplifier (LNA), a duplexer, etc. In addition, the RF circuit 910 may further communicate with other devices via wireless communication and a network. The wireless communication may use any one communication standard or protocol, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc.

The mobile phone may further include at least one sensor 950 such as a light sensor, a motion sensor and other sensors. Specifically, the light sensor may include an ambient light sensor and a proximity sensor, the ambient light sensor may adjust the luminance of the touch display screen according to the brightness of ambient light, and the proximity sensor may cause the touch display screen and/or backlight to be turned off. As one of the motion sensors, an accelerometer sensor may detect the magnitude of an accelerated speed in each direction (generally, three-axis), the size and direction of a gravity may be detected while resting, and the accelerometer sensor may be used in applications related to attitudes of the mobile phone (e.g., horizontal and vertical screen switching, relevant games, and magnetometer attitude calibration), and vibration identification relevant functions (e.g., pedometer and knocking). Other sensors such as a gyroscope sensor, a barometer sensor, a hygrometer sensor, a thermometer sensor and an infrared sensor may also be equipped in the mobile phone, which will not be elaborated herein.

The audio circuit 960, a loudspeaker 961 and a microphone 962 may provide an audio interface between the user and the mobile phone. The audio circuit 960 may transmit an electric signal converted from the received audio data to the loudspeaker 961, and the loudspeaker 961 converts the electric signal into a sound signal for playing. Besides, the microphone 962 converts a collected sound signal into an electric signal, the audio circuit 960 converts the received electric signal into audio data and then outputs the audio data to the AP 980 for processing, the audio data is transmitted to another mobile phone via the RF circuit 910, or the audio data is output to the memory 920 for further processing.

Wireless Fidelity (WiFi) is a short-range wireless transmission technology, the mobile phone may assist the user in E-mail receiving and sending, webpage browsing, access to streaming media and the like by means of the WiFi module 970, and it provides a wireless wideband internet access for the user. Although FIG. 11 illustrates the WiFi module 970, it may be understood that the WiFi module is not a necessary component of the mobile phone and can be omitted as required, without changing the essence of the disclosure.

The mobile phone furthers include a power supply 990 (such as a battery) for supplying power to each component. Alternatively, the power supply may be connected with the AP 980 logically via a power supply management system, so as to implement functions of charging, discharging and power consumption management by means of the power supply management system.

Although not illustrated, the mobile phone may also include a camera, a Bluetooth module, etc., and will not be elaborated herein.

In the embodiments illustrated in FIG. 5 and FIG. 6, each method flow may be implemented based on the structure of the mobile phone.

In the embodiments illustrated in FIG. 7, and FIG. 8 to FIG. 10, each unit function may be implemented based on the structure of the mobile phone.

The embodiments of the disclosure also provide a computer storage medium, wherein the computer storage medium stores a computer program for electronic data exchange, the computer program enabling a computer to execute some or all operations of any iris-based living-body detection method in the above-mentioned method embodiment.

The embodiments of the disclosure also provide a computer program product, which includes a non-transitory computer-readable storage medium storing a computer program, wherein the computer program is operable to enable a computer to execute some or all operations of any iris-based living-body detection method in the above-mentioned method embodiment.

It is to be noted that for simplifying the description, each of the above-mentioned method embodiments is expressed as a series of action combinations. However, a person skilled in the art should learn of that the disclosure is not limited by a described action sequence. That is because some operations may be executed in other sequences or at the same time according to the disclosure. Secondly, a person skilled in the art should also learn of that the embodiments described in the specification fall within preferable embodiments, and involved actions and modules may not be necessary for the disclosure.

In the above-mentioned embodiments, descriptions for each embodiment are emphasized respectively, and parts which are not elaborated in a certain embodiment may refer to relevant descriptions for other embodiments.

In some embodiments provided by the present application, it is to be understood that the disclosed apparatus may be implemented in another manner. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The above-mentioned units described as separate parts may or may not be physically separated, and parts displayed as units may or may not be physical units, and namely may be located in the same place, or may also be distributed to multiple network units. Part or all of the units may be selected to achieve the purpose of the solutions of the present embodiment according to a practical requirement.

In addition, each function unit in each embodiment of the disclosure may be integrated into a processing unit, each unit may also exist independently, and two or more than two units may also be integrated into a unit. The above-mentioned integrated unit may be implemented in a form of hardware, and may also be implemented in a form of software function unit.

When being implemented in form of software function unit and sold or used as an independent product, the integrated unit may also be stored in a computer-readable storage medium. Based on such an understanding, the technical solutions of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The above-mentioned memory includes: various media capable of storing program codes such as a U disk, a Read-Only Memory (ROM), a Random Access Memory (RAM), a mobile hard disk, a magnetic disk or an optical disk.

Those of ordinary skill in the art may understand that all or some operations in each method in the above-mentioned embodiments may be completed by instructing relevant hardware through a program, wherein the program may be stored in a computer-readable memory, and the memory may include: a flash disk, an ROM, an RAM, a magnetic disk or an optical disk.

The embodiments of the disclosure have been described in detail above, and the principles and the implementation manners of the disclosure have been described in specific examples herein. The above-mentioned embodiments are only used to help understand the method and the core idea of the disclosure. Meanwhile, those of ordinary skill in the art, based on the idea of the disclosure, will have changes in specific implementation manners and application ranges. In summary, the contents of this specification should not be construed as limiting the disclosure.

The invention claimed is:

1. An iris-based living-body detection method, executed by a mobile terminal comprising a touch display screen and an iris recognition apparatus, the method comprising: in response to detection of the mobile terminal being lifted, lighting the touch display screen, and controlling the touch display screen to display preset guide content, wherein the preset guide content is used to guide eyes watching the touch display screen to move; notifying the iris recognition apparatus to perform iris acquisition for a target object associated with the eyes, to obtain a plurality of iris images; determining whether the target object is a living body with the plurality of iris images; wherein matching the iris image to be matched with the preset iris template comprises: performing multi-scale decomposition on the iris image to be matched by using a multi-scale decomposition algorithm to obtain a first high-frequency component image of the iris image to be matched, and performing feature extraction on the first high-frequency component image to obtain a first feature set; performing multi-scale decomposition on the preset iris template by using the multi-scale decomposition algorithm to obtain a second high-frequency component image of the preset iris template, and performing feature extraction on the second high-frequency component image to obtain a second feature set; screening the first feature set and the second feature set to obtain a first stable feature set and a second stable feature set; and performing feature matching on the first stable feature set and the second stable feature set, and when the number of matched feature points between the first stable feature set and the second stable feature set is greater than a preset number threshold, confirming that the iris image to be matched is matched with the preset iris template successfully.

2. The method according to claim 1, wherein determining whether the target object is a living body with the plurality of iris images comprises:
determining a constriction change rate of a pupil with the plurality of iris images, and
confirming that the target object is a living body, when the constriction change rate is within a preset range.

3. The method according to claim 2, wherein determining the constriction change rate of a pupil with the plurality of iris images comprises:
determining an area of the pupil for each of the plurality of iris images successively in shooting time sequence, to obtain a plurality of area values; and
determining change rates between successive area values in the plurality of area values, and taking an average value of all the change rates as the constriction change rate.

4. The method according to claim 1, wherein the mobile terminal is further provided with a motion sensor, and the method further comprises:
acquiring a value of a motion parameter by means of the motion sensor, and determining an anti-shake coefficient corresponding to the value of the motion parameter,
wherein performing iris acquisition for the target object by means of the iris recognition apparatus, to obtain a plurality of iris images comprises:
performing iris acquisition for the target object by means of the iris recognition apparatus according to the anti-shake coefficient, to obtain a plurality of iris images.

5. The method according to claim 1, wherein the mobile terminal is further provided with an ambient sensor, and the method further comprises:
acquiring a value of an ambient parameter by means of the ambient sensor, and determining a value of an iris acquisition parameter corresponding to the value of the ambient parameter,
wherein performing iris acquisition for the target object by means of the iris recognition apparatus, to obtain a plurality of iris images comprises:
performing iris acquisition for the target object by means of the iris recognition apparatus according to the value of the iris acquisition parameter, to obtain a plurality of iris images.

6. The method according to claim 1, wherein determining whether the target object is a living body with the plurality of iris images comprises:
selecting an iris image with a best image quality as an iris image to be matched from the multiple iris images, and
matching the iris image to be matched with a preset iris template; and when the matching is successful, determining that the target object is a living body.

7. A mobile terminal, comprising an iris recognition apparatus, a touch display screen, and a processor, wherein the processor is configured to, in response to detection of the mobile terminal being lifted: light the touch display screen and control the touch display screen to display preset guide content, wherein the preset guide content is used to guide eyes watching the touch display screen to move; notify the iris recognition apparatus to perform iris acquisition for a target object associated with the eyes, so as to obtain a plurality of iris images; and determine whether the target object associated with the eyes is a living body with the plurality of iris images; the touch display screen is configured to display the preset guide content after being lighted; the iris recognition apparatus is configured to perform iris acquisition for the target object; wherein in order to match the iris image to be matched with the preset iris template, the processor is configured to: perform multi-scale decomposition on the iris image to be matched by using a multi-scale decomposition algorithm to obtain a first high-frequency component image of the iris image to be matched, and perform feature extraction on the first high-frequency component image to obtain a first feature set; perform multi-scale decomposition on the preset iris template by using the multi-scale decomposition algorithm to obtain a second high-frequency component image of the preset iris template, and perform feature extraction on the second high-frequency component image to obtain a second feature set; screen the first feature set and the second feature set to obtain a first stable feature set and a second stable feature set; and perform feature matching on the first stable feature set and the second stable feature set, and when the number of matched feature points between the first stable feature set and the second stable feature set is greater than a preset number threshold, confirm that the iris image to be matched is matched with the preset iris template successfully.

8. The mobile terminal according to claim 7, wherein in terms of determining whether the target object is a living body with the plurality of iris images, the processor is configured to:
  determine a constriction change rate of a pupil with the plurality of iris images, and
  confirm that the target object is a living body when the constriction change rate is within a preset range.

9. The mobile terminal according to claim 8, wherein in terms of determining a constriction change rate of a pupil with the plurality of iris images, the processor is configured to:
  determine an area of the pupil for each of the plurality of iris images successively in shooting time sequence, so as to obtain a plurality of area values; and
  determine change rates between successive area values in the plurality of area values, and take an average value of all the change rates as the constriction change rate.

10. The mobile terminal according to claim 7, further comprising a motion sensor, wherein
  the motion sensor is configured to acquire a value of a motion parameter and send the value of the motion parameter to the processor, and
  the processor is configured to determine an anti-shake coefficient corresponding to the value of the motion parameter and send the anti-shake coefficient to the iris recognition apparatus.

11. The mobile terminal according to claim 7, further comprising an ambient sensor, wherein
  the ambient sensor is configured to obtain a value of an ambient parameter and send the ambient parameter to the processor, and
  the processor is configured to determine a value of an iris acquisition parameter corresponding to the value of the ambient parameter and send the value of the iris acquisition parameter to the iris recognition apparatus.

12. The mobile terminal according to claim 7, wherein in order to determine whether the target object is a living body with the plurality of iris images, the processor is configured to:
  select an iris image with a best image quality as an iris image to be matched from the multiple iris images, and match the iris image to be matched with a preset iris template; and
  when the matching is successful, determine that the target object is a living body.

13. A non-transitory computer-readable storage medium, configured to store a computer program, wherein the computer program enables a computer to execute an iris-based living-body detection method, the method comprising: in response to detection of a mobile terminal being lifted, lighting a touch display screen, controlling the touch display screen to display preset guide content, wherein the preset guide content is used to guide eyes watching the touch display screen to move; notifying an iris recognition apparatus to perform iris acquisition for a target object associated with the eyes, to obtain a plurality of iris images; determining whether the target object is a living body with the plurality of iris images; wherein determining whether the target object is a living body with the plurality of iris images comprises: selecting an iris image with a best image quality as an iris image to be matched from the multiple iris images, and matching the iris image to be matched with a preset iris template; and when the matching is successful, determining that the target object is a living body, wherein matching the iris image to be matched with the preset iris template comprises: performing multi-scale decomposition on the iris image to be matched by using a multi scale decomposition algorithm to obtain a first high-frequency component image of the iris image to be matched, and performing feature extraction on the first high-frequency component image to obtain a first feature set; performing multi-scale decomposition on the preset iris template by using the multi-scale decomposition algorithm to obtain a second high-frequency component image of the preset iris template, and performing feature extraction on the second high-frequency component image to obtain a second feature set; screening the first feature set and the second feature set to obtain a first stable feature set and a second stable feature set; and performing feature matching on the first stable feature set and the second stable feature set, and when the number of matched feature points between the first stable feature set and the second stable feature set is greater than a preset number threshold, confirming that the iris image to be matched is matched with the preset iris template successfully.

14. The non-transitory computer-readable storage medium according to claim 13, wherein determining whether the target object is a living body with the plurality of iris images comprises:
  determining a constriction change rate of a pupil with the plurality of iris images, and
  confirming that the target object is a living body, when the constriction change rate is within a preset range.

15. The non-transitory computer-readable storage medium according to claim 14, wherein determining the constriction change rate of a pupil with the plurality of iris images comprises:
  determining an area of the pupil for each of the plurality of iris images successively in shooting time sequence, to obtain a plurality of area values; and
  determining change rates between successive area values in the plurality of area values, and taking an average value of all the change rates as the constriction change rate.

16. The non-transitory computer-readable storage medium according to claim 13, wherein the method further comprises:
  acquiring a value of a motion parameter from a motion sensor, and determining an anti-shake coefficient corresponding to the value of the motion parameter,
  wherein performing iris acquisition for the target object by means of the iris recognition apparatus, to obtain a plurality of iris images comprises:

performing iris acquisition for the target object by means of the iris recognition apparatus according to the anti-shake coefficient, to obtain a plurality of iris images.

17. The non-transitory computer-readable storage medium according to claim 13, wherein the method further comprises:
acquiring a value of an ambient parameter form an ambient sensor, and determining a value of an iris acquisition parameter corresponding to the value of the ambient parameter,
wherein performing iris acquisition for the target object by means of the iris recognition apparatus, to obtain a plurality of iris images comprises:
performing iris acquisition for the target object by means of the iris recognition apparatus according to the value of the iris acquisition parameter, to obtain a plurality of iris images.

* * * * *